US012620717B2

(12) United States Patent
Fung et al.

(10) Patent No.: US 12,620,717 B2
(45) Date of Patent: May 5, 2026

(54) TUNING DIELECTRIC MATERIAL IN A PATCH ANTENNA ARRAY

(71) Applicant: BAE SYSTEMS Information and Electronic Systems Integration Inc., Nashua, NH (US)

(72) Inventors: James F. Fung, Manchester, NH (US); Alexander D. Johnson, Waltham, MA (US); Jean L. Kubwimana, Merrimack, NH (US); Jacob Tamasy, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 101 days.

(21) Appl. No.: 18/352,638

(22) Filed: Jul. 14, 2023

(65) Prior Publication Data

US 2025/0023245 A1 Jan. 16, 2025

(51) Int. Cl.
*H01Q 9/04* (2006.01)

(52) U.S. Cl.
CPC ................................ *H01Q 9/0442* (2013.01)

(58) Field of Classification Search
CPC .......................... H01Q 9/0414; H01Q 9/0407
See application file for complete search history.

(56) References Cited

U.S. PATENT DOCUMENTS 6,211,824 B1 4/2001 Holden et al.
7,161,535 B2 1/2007 Palmer et al.
7,161,555 B2 1/2007 Ohno et al.
9,112,262 B2 8/2015 Warnick et al.
10,381,735 B2 8/2019 Miraftab et al.
10,547,118 B2 1/2020 Guntupalli et al.
11,211,709 B2 12/2021 Lim et al.
11,695,219 B2 7/2023 Govoni et al.
11,969,788 B1 4/2024 Kubwimana et al.
12,237,573 B2 2/2025 Johnson
(Continued)

FOREIGN PATENT DOCUMENTS

EP 1958290 B1 3/2019
EP 3033804 B1 12/2020
(Continued)

OTHER PUBLICATIONS

International Search Report, PCT/US24/37357, mailed Oct. 11, 2024, 18 pages.

*Primary Examiner* — Awat M Salih
(74) *Attorney, Agent, or Firm* — Gary McFaline

(57) ABSTRACT

An antenna assembly includes a ground plane including conductive material, and a dielectric material above the ground plane. A patch antenna is on the dielectric material. In an example, a plurality of features extends from an upper surface or a lower surface of the dielectric material and within the dielectric material, wherein the plurality of features comprises voids filled with gas or are vacuum. Additionally, or alternatively, the dielectric material is doped with a dopant. In an example, the antenna assembly further includes a first aperture and a second aperture on the ground plane and below the patch antenna, and another dielectric material below the first and second apertures. In some such cases, a first feed line is below the first aperture, and a second feed line is below the second aperture.

8 Claims, 9 Drawing Sheets

(56) References Cited

U.S. PATENT DOCUMENTS

| | | | | |
|---|---|---|---|---|
| 2004/0027285 | A1* | 2/2004 | Fang | H01Q 5/40 343/700 MS |
| 2004/0104847 | A1 | 6/2004 | Killen et al. | |
| 2015/0015453 | A1* | 1/2015 | Puzella | H05K 1/0206 333/1.1 |
| 2015/0162663 | A1 | 6/2015 | Boryssenko et al. | |
| 2019/0305430 | A1 | 10/2019 | Thai et al. | |
| 2020/0295075 | A1 | 9/2020 | Goldstein et al. | |
| 2022/0328968 | A1 | 10/2022 | Johnson et al. | |
| 2023/0144206 | A1 | 5/2023 | Dogiamis et al. | |
| 2024/0250430 | A1* | 7/2024 | Kubwimana | H01Q 9/045 |
| 2024/0250431 | A1* | 7/2024 | Kubwimana | H01Q 9/0414 |
| 2024/0283154 | A1 | 8/2024 | Johnson et al. | |
| 2024/0283168 | A1 | 8/2024 | Tamasy et al. | |
| 2025/0030166 | A1 | 1/2025 | Kubwimana et al. | |

FOREIGN PATENT DOCUMENTS

| | | | |
|---|---|---|---|
| GB | 2517231 | A | 2/2015 |
| WO | 2004034515 | A1 | 4/2004 |
| WO | 2008/032960 | A1 | 3/2008 |
| WO | 2024/172844 | | 8/2024 |

* cited by examiner

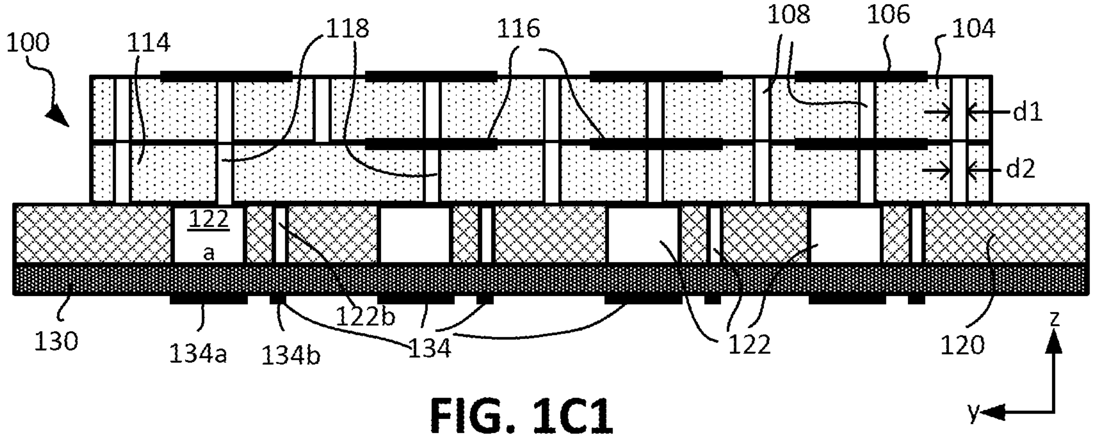
FIG. 1C1
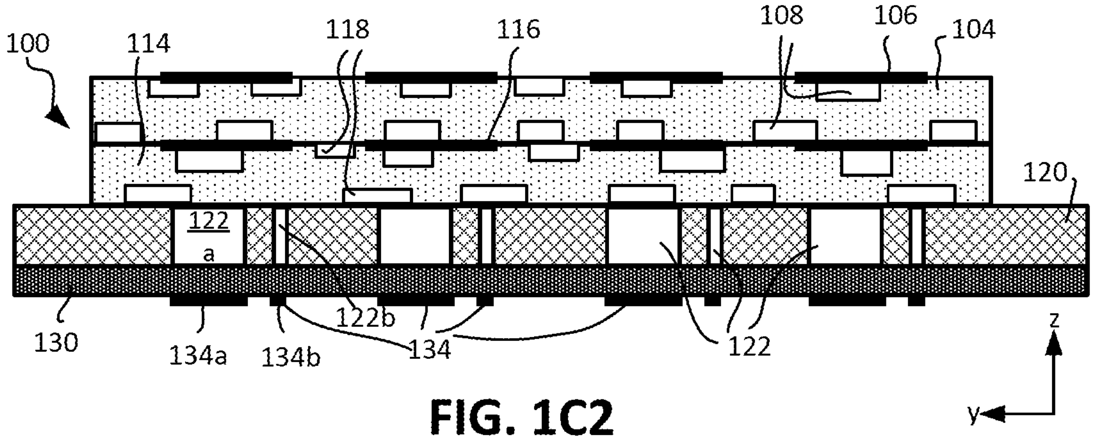
FIG. 1C2
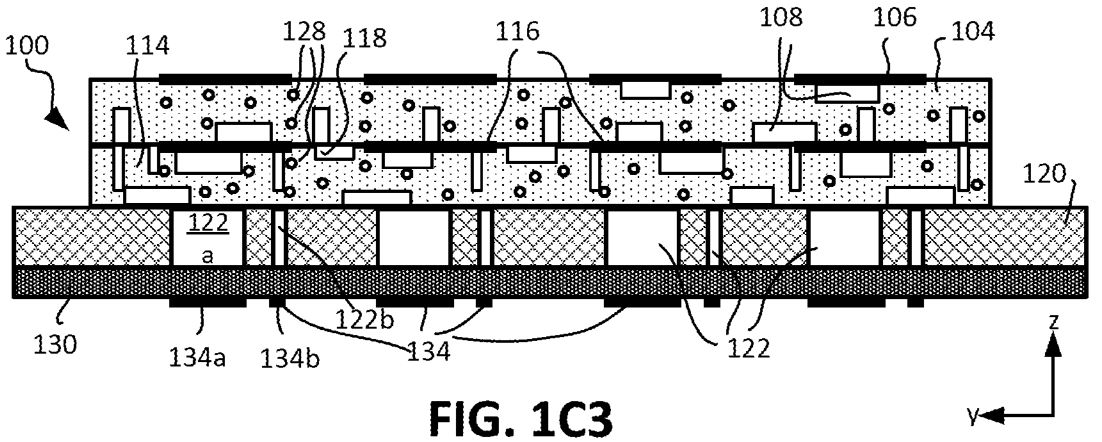
FIG. 1C3

FIG. 1C4

TUNING DIELECTRIC MATERIAL IN A PATCH ANTENNA ARRAY

FIELD OF DISCLOSURE

The present disclosure relates to antennas, and more particularly, to dielectric material within patch antenna structures.

BACKGROUND

A patch antenna is a type of antenna with a low profile, which can be mounted on a surface. It includes a sheet or "patch" of metal, mounted over a larger sheet of metal called a ground plane. The metal sheets (the ground plane and the patch) together form a resonant transmission line with a length of approximately one-half wavelength of the radio waves. The radiation mechanism arises from fringing fields along the radiating edges. A patch antenna is often used at microwave frequencies, at which wavelengths are short enough that the patches are relatively small. There remain a number of non-trivial challenges with respect to designing and manufacturing patch antenna structures.

BRIEF DESCRIPTION OF THE DRAWINGS

FIG. 1C1 illustrates an alternate example of the antenna array of FIGS. 1A-1C, wherein in FIG. 1C1, a size and/or a density of the first plurality of features (such as openings or holes) extending at least in part within the first dielectric material is substantially equal to those of the second plurality of features (such as openings or holes) extending at least in part within the second dielectric material, in accordance with an embodiment of the present disclosure.

FIG. 1C2 illustrates another alternate example of the antenna array of FIGS. 1A-1C, wherein in FIG. 1C2, the first plurality of features extend partially, and not fully, through the first dielectric material, and the second plurality of features extend partially, and not fully, through the second dielectric material, in accordance with an embodiment of the present disclosure.

FIG. 1C3 illustrates another alternate example of the antenna array of FIGS. 1A-1C, wherein in FIG. 1C3, a plurality of bubbles are intentionally introduced within the first dielectric material and the second dielectric material, in accordance with an embodiment of the present disclosure.

FIG. 1C4 illustrates another alternate example of the antenna array of FIGS. 1A-1C, wherein in FIG. 1C4, the first dielectric material and the second dielectric material are doped with a dopant, in accordance with an embodiment of the present disclosure.

FIG. 3 illustrates a flowchart depicting a method of forming the example antenna array of FIGS. 1A-1D, in accordance with an embodiment of the present disclosure.

Figure 1A:
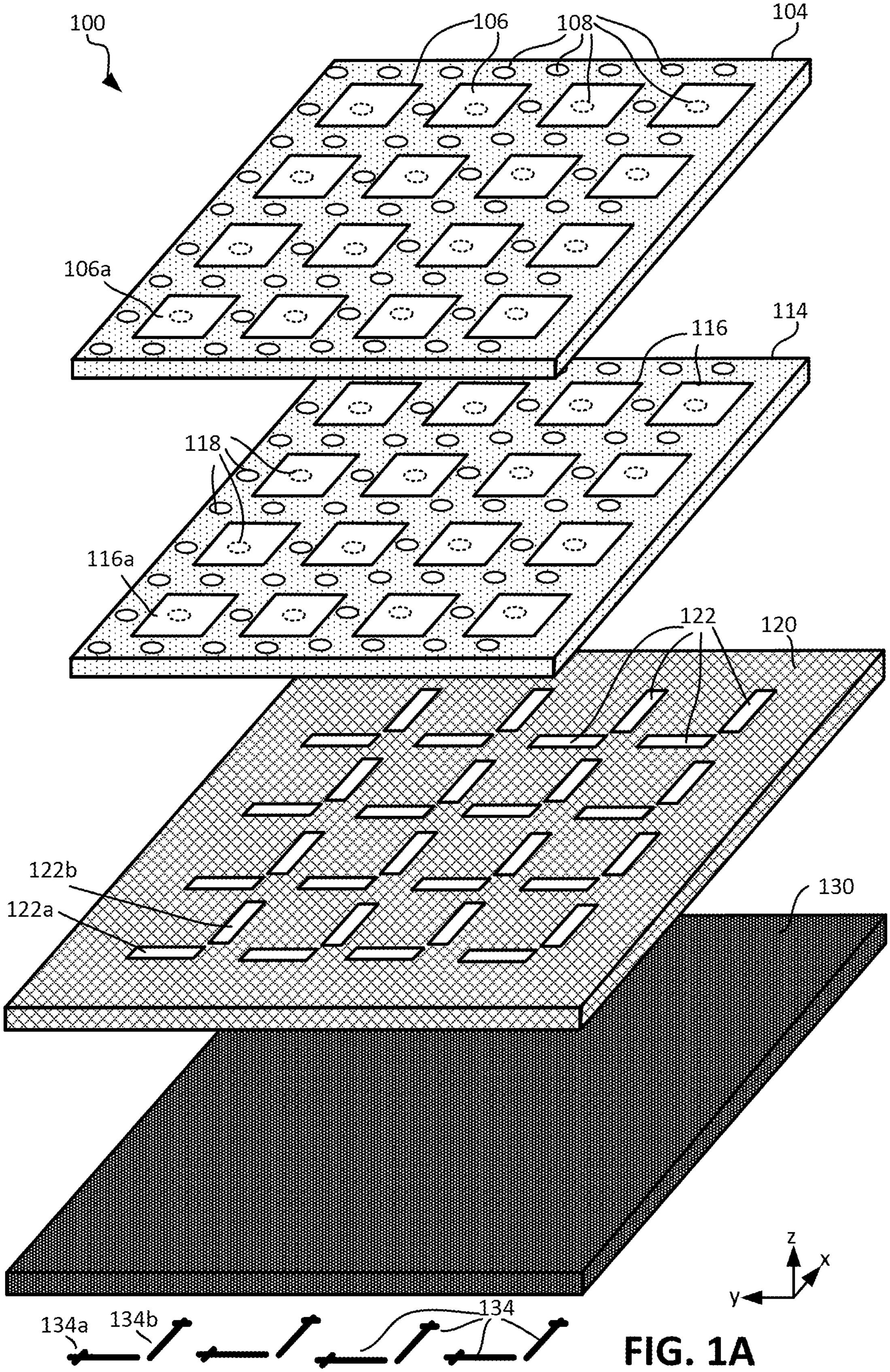
FIGS. 1A, 1B, and 1C illustrate various views of an antenna array, wherein the antenna array comprises (i) a first dielectric material, with a first plurality of features (such as openings or holes) extending at least in part within the first dielectric material, (ii) a first plurality of patch antennas on the first dielectric material, (iii) a second dielectric material below the first dielectric material, with a second plurality of features (such as openings or holes) extending at least in part within the second dielectric material, (iv) a second plurality of patch antennas on the second dielectric material, and (v) a conductive ground plane below the second dielectric material, in accordance with an embodiment of the present disclosure.

Although the following detailed description will proceed with reference being made to illustrative examples, many alternatives, modifications, and variations thereof will be apparent in light of this disclosure.

DETAILED DESCRIPTION

Antenna assemblies are disclosed. An example assembly includes a dual polarized, aperture fed, patch antenna array, wherein a bandwidth of the antenna array is tunable by controlling effective dielectric constants of dielectric materials supporting the patch antennas. For example, features, such as holes or voids, are machined or otherwise formed within the dielectric materials, which alters dielectric constants of the dielectric materials. In another example, pores, such as bubbles (e.g., air bubbles), are introduced within the dielectric materials, which alters dielectric constants of the dielectric materials. In yet another example, the dielectric materials are doped with appropriate dopant(s), which alters dielectric constants of the dielectric materials. Altering the dielectric constants of the dielectric materials affects the bandwidth of the antenna array, and in some example cases results in a relatively larger bandwidth of the antenna array.

In one embodiment, an antenna assembly comprises a ground plane including conductive material, and a dielectric material above the ground plane. A plurality of features, such as holes or other appropriately shaped features, extends at least in part within the dielectric material. Additionally, or alternatively, the dielectric material is doped with a dopant. Additionally, or alternatively, air bubbles or pores are introduced within the dielectric material. The antenna assembly further includes a patch antenna on the dielectric material. In an example, the dielectric material comprises a foam. In an example, the dielectric material may further include pores that may be intrinsic part of the dielectric material, which are different from the features machined within the dielectric material. In an example, the antenna assembly further includes a first aperture and a second aperture on the ground plane and below the patch antenna, and another dielectric material below the first and second apertures. A first feed line is below the first aperture, and a second feed line is below the second aperture.

In some examples, the above described patch antenna is a lower patch antenna and the dielectric material is a lower dielectric material. In some such examples, the antenna assembly further comprises an upper dielectric material above the lower dielectric material, and an upper patch antenna on the upper dielectric material. In some examples, another plurality of holes extends at least in part within the upper dielectric material. In some such examples, the upper dielectric material comprises a foam. Thus, an antenna structure comprises the ground plane including the first aperture and the second aperture, the lower patch antenna on the lower dielectric material that is above the ground plane, and the upper patch antenna on the upper dielectric material. In an example, an antenna array comprises several such antenna structures arranged in an array, where the ground plane is a common ground plane for the array of antenna structures. Similarly, each of the upper dielectric material and the lower dielectric material is also common to the array of antenna structures.

In another embodiment, a method of forming an antenna assembly includes forming an upper dielectric material, attaching an upper patch antenna on the upper dielectric material, and forming a plurality of features, such as holes, within the upper dielectric material. The plurality of holes within the dielectric material may be formed prior to, or subsequent to, attaching the upper patch antenna to the upper dielectric material. The method further includes similarly forming a lower dielectric material, attaching a lower patch antenna on the lower dielectric material, and forming a plurality of holes within the lower dielectric material. In an example, in addition to or instead of forming the holes, air bubbles are introduced within the upper and lower dielectric material. In another example, in addition to or instead of forming the holes, the upper and lower dielectric materials are doped with one or more dopants. The method further includes forming a ground plane having a plurality of apertures, and a corresponding plurality of feed lines below the plurality of apertures. The method further includes attaching the lower dielectric material, with the corresponding plurality of holes or air bubbles or dopants therewithin and the lower patch antenna thereon, above the ground plane; and attaching the upper dielectric material, with the corresponding plurality of holes or air bubbles or dopants therewithin and the upper patch antenna thereon, above the lower dielectric material and the lower patch antenna. Numerous configurations and variations will be apparent in light of this disclosure.

General Overview

As mentioned herein above, there remain a number of non-trivial challenges with respect to designing and manufacturing patch antenna assemblies. For example, it may be desirable to design and operate a patch antenna array over a tunable and relatively large bandwidth.

Accordingly, techniques are described herein to form an antenna assembly that includes a dual polarized, aperture fed, patch antenna array, in which the frequency spectrum of the antenna array is tunable by controlling effective dielectric constant of dielectric materials supporting the patch antennas. In some examples, an array of the patch antennas is on a layer of dielectric material that is above a ground plane, where the dielectric material comprises a dielectric foam, for example. In some such examples, features, such as holes or voids, are machined or otherwise formed within the dielectric material, which alters a dielectric constant of the dielectric material. Note that a hole, as used herein, may be a type of a feature that may be machined within the dielectric material. A feature, as used herein, may be a void or opening and may have any appropriate geometrical shape and size, such as (i) the holes illustrated in FIGS. 1C and 1C1, or (ii) may be shaped or sized differently from a hole, as illustrated in FIG. 1C2. Holes are primarily used herein for description, and such description may also be applicable to other features as well, such as those illustrated in FIG. 1C2, unless otherwise stated. In an example, in addition to, or instead of introducing the holes, a plurality of pores, such as bubbles, are introduced within the dielectric material, which alters the dielectric constant of the dielectric material. In yet another example, in addition to, or instead of introducing the holes, the dielectric material is doped with appropriate dopant(s), which alters dielectric constant of the dielectric material. Altering the dielectric constant of the dielectric material affects the bandwidth of the antenna array, which in some example cases results in a relatively larger bandwidth of the antenna array.

In one embodiment, an antenna array comprises a ground plane comprising conductive material, such as one or more metals (e.g., copper) and/or alloys thereof. The antenna array comprises a plurality of antenna structures, such as an array of antenna structures, with a common ground plane for the plurality of antenna structures.

In some examples, the antenna array may be aperture fed, such that the ground plane comprises a plurality of apertures, which are openings within the ground plane. Each antenna structure of the antenna array may comprise one or more corresponding apertures within the ground plane. For example, each antenna structure may comprise two corresponding apertures within the ground plane, one for vertical polarization, and another for horizontal polarization. Thus, the antenna structure may a dual polarized antenna structure, in some examples.

In one embodiment, the antenna array includes a plurality of feed lines below the ground plane, wherein the feed lines may be separate from the ground plane by a dielectric material. Each feed line may be below a corresponding aperture slot. For example, each antenna structure of the antenna array has two corresponding feed lines, e.g., corresponding to the horizontal and the vertical polarization signals, respectively.

There may be a single array of patch antennas above the ground plane, or more than one array of patch antennas above the ground plane. For example, FIGS. 1A-1D illustrate two vertically stacked arrays of patch antennas above the ground plane, although there may be a different number (such as one or three) of such array of patch antennas. For example, as illustrated in FIGS. 1A-1D, a lower dielectric material is above the ground plane, and a lower array of patch antennas is on the lower dielectric material. Similarly, an upper dielectric material is above the lower dielectric material and the lower array of patch antennas. Also, an upper array of patch antennas is on the upper dielectric material.

In one embodiment, each antenna structure of the antenna array comprises (i) one lower patch antenna of the lower array of patch antennas and (ii) one upper patch antenna of the upper array of patch antennas, where the upper patch antenna is above the lower patch antenna, and separated from the lower patch antenna by the upper dielectric material. Also, the lower patch antenna is separated from the ground plane by the lower dielectric material. Furthermore, the lower patch antenna is above two corresponding apertures within the ground plane, where the two corresponding apertures are respectively above two corresponding feed lines. The antenna array comprises several such antenna structures arranged in an array.

In one embodiment, one or both of the lower dielectric material and the upper dielectric material has features, such as holes or voids, formed therewithin. The features may be machined or otherwise formed within the upper and/or lower dielectric materials. In another example, the dielectric materials, including the features, may be formed by an additive manufacturing process. In another example, the upper and lower dielectric materials include intentionally introduced pores, such as air bubbles. In yet another example, the upper and lower dielectric materials are doped with appropriate dopant(s).

It may be noted that the upper and lower dielectric materials (which may be foam, for example) may be porous, e.g., has pores therewithin. Such pores may be an intrinsic part of the upper and lower dielectric materials or intentionally formed therein via a pore-forming process (e.g., via a burn-out process that removes sacrificial material embedded within the dielectric material), and the features, such as holes, described here are different from such pores. For example, the holes are not intrinsic or natural part of the corresponding dielectric material, and are intentionally formed (e.g., machined) within the dielectric materials. In some examples in which the upper and/or lower dielectric materials comprise foams, an average diameter of the holes is substantially larger (e.g., at least 1.2×, or at least 1.5×, or at least 2×, or at least 2.5×, or at least 3×, or at least 4×, or at least 5×) than the an average diameter of the pores. For example, the pores of the upper and lower dielectric materials may have a diameter of at most 0.1 mm, or at most 0.2 mm, or at most 0.3 mm, or at most 0.4 mm, and are formed intrinsically when forming the upper and lower dielectric materials. In contrast, the holes of the upper and lower dielectric materials are machined after the dielectric material have been formed, and may have a diameter of at least 0.15 mm, or at least 0.2 mm, or at least 0.5 mm, or at least 0.6 mm, or at least 0.7 mm, or at least 0.8 mm, or at least 0.9 mm, or at least 1 mm, or at least 2 mm, or at least 3 mm, or at least 4 mm, or at least 5 mm, for example. More generally, at least some of the pores of the dielectric material may be completely encased within (closed cell) the dielectric material, whereas the holes will breach at least one surface of the dielectric material. Some pores may also breach a given surface of the dielectric material, but not all pores.

In an example, a hole extends within and through a corresponding dielectric material (e.g., see FIG. 1C). For example, a hole extends from an upper surface of the upper (or lower) dielectric material to a lower surface of the upper (or lower) dielectric material. However, in another example, a feature may extend partially, but not fully, through the corresponding dielectric material, as illustrated in FIG. 1C2. Note that in FIG. 2C2, the features may be shaped and/or sized differently from holes. The features may be voids or openings within the upper and lower dielectric materials, and may have any appropriate shape and dimensions.

In another example, pores, e.g., comprising air bubbles, are intentionally introduced within the dielectric upper and lower materials. For example, the air bubbles are introduced using a blowing agent during the upper and lower dielectric material formation process. The blowing agent, when cured, entraps air within the dielectric materials. In yet another example, the upper and lower dielectric materials are doped with appropriate dopants.

In an example, a filling ratio of each of the upper and lower dielectric materials can be defined to be a ratio of (i) a volume of the corresponding dielectric material, and (ii) total volume of the corresponding dielectric material and the holes therewithin. Note that the total volume of the dielectric material and the holes therewithin is constant, e.g., irrespective of a number of holes or sizes of holes formed within the dielectric material.

Figure 2A:
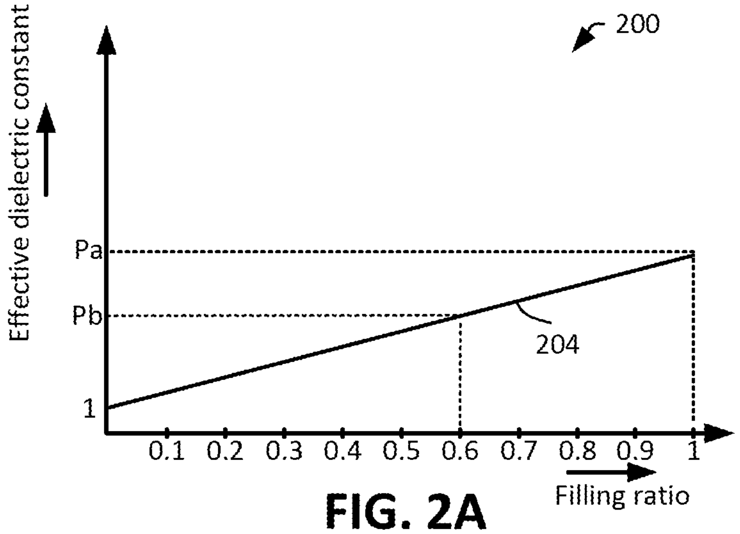
FIG. 2A illustrates a graph depicting a relationship between a filling ratio of one or both the first dielectric material and the second dielectric material of FIGS. 1A-1D versus an effective dielectric constant of the dielectric material (e.g., with holes therewithin), wherein the filling ratio can be tuned by tuning formation of holes within the dielectric material, in accordance with an embodiment of the present disclosure.

As illustrated in FIG. 2A, the filling ratio may vary between 0 and 1, where a filling ratio of 1 corresponds to no holes being formed within the dielectric material. As and when more holes are formed within the dielectric material and/or sizes of the holes within the dielectric material increases, the filing ratio decreases. For example, in an extreme case when the holes consume entirety of the dielectric material (e.g., no dielectric material is any longer present), this corresponds to a filling ratio of 0. In another example case, when the holes consume about 25% of the dielectric material (e.g., 75% of dielectric material remains), this corresponds to a filling ratio of 0.75.

In one embodiment, an effective dielectric constant of a dielectric material may be based on the filling ratio of the dielectric material. For example, increasing number and/or sizes of holes within a dielectric material decreases the filling ratio, which in turn decreases an effective dielectric constant of the dielectric material. Thus, the effective dielectric constants of the upper and/or lower dielectric materials may be tuned, e.g., by forming holes with the upper and/or lower dielectric materials. As described, the dopant and/or air bubbles introduced within the upper and/or lower dielectric materials may also affect the effective dielectric constants of the upper and/or lower dielectric materials.

Furthermore, in an example, a bandwidth of the antenna array may be based at least in part on the effective dielectric constants of the upper and/or lower dielectric materials. Thus, the bandwidth of the antenna array may be tuned or controlled, by forming holes within the upper and/or dielectric materials, as described below in further detail. Thus, the antenna array may be scaled across the frequency spectrum, e.g., by choosing a corresponding filling ratio of the dielectric material for achieving an effective dielectric constant of the dielectric material, where the filling ratio may be controlled by controlling the number and/or size of holes within the dielectric material. Thus, changing the effective dielectric constant of the upper and/or lower dielectric materials may impact a bandwidth of the antenna array. In some examples, lowering the effective dielectric constant of the upper and/or lower dielectric materials may improve, or otherwise change, the bandwidth of the antenna array. Thus, a number and/or size of holes perforated within the upper and/or lower dielectric materials may be customized, to tune or adjust the frequency spectrum or bandwidth of the antenna array, while maintaining a minimum or lower threshold level of filling ratio for mechanical or structural stability of the upper and/or lower dielectric materials (e.g., such that the dielectric materials are able to effectively support the patch antennas thereon).

The holes within the upper and/or lower dielectric materials may be formed, for example, using a subtractive process, such as machining (e.g., pressing, drilling, CNC-based removal, and laser ablation, to name a few examples) the upper and/or lower dielectric materials. In other examples, the holes of a given layer can be formed as a result of a molding process, where the dielectric material is injected into a mold that is configured to provide the holes. In yet other examples, the dielectric material, including the holes, of a given layer can be formed as a result of an additive manufacturing process. Formation of the holes within the upper and/or lower dielectric materials may be performed prior to, or subsequent to, attaching the upper and/or lower arrays of patch antennas on the respective dielectric material. A formation process of the antenna array is described in further detail below (e.g., see FIGS. 3 and 4A-4D). Numerous configurations and variations will be apparent in light of this disclosure.

Materials that are "compositionally different" or "compositionally distinct" as used herein refers to two materials that have different chemical compositions. This compositional difference may be, for instance, by virtue of an element that is in one material but not the other (e.g., copper is compositionally different than an alloy of copper), or by way of one material having all the same elements as a second material but at least one of those elements is intentionally provided at a different concentration in one material relative to the other material (e.g., two copper alloys each having copper and tin, but with different percentages of copper, are also compositionally different). If two materials are elementally different, then one of the materials has an element that is not in the other material (e.g., pure copper is elementally different than an alloy of copper; and two copper alloys each having copper and tin, but with different percentages of copper, are elementally the same).

It should be readily understood that the meaning of "above" and "over" in the present disclosure should be interpreted in the broadest manner such that "above" and "over" not only mean "directly on" something but also include the meaning of over something with an intermediate feature or a layer therebetween. As will be appreciated, the use of terms like "above" "below" "beneath" "upper" "lower" "top" and "bottom" are used to facilitate discussion and are not intended to implicate a rigid structure or fixed orientation; rather such terms merely indicate spatial relationships when the structure is in a given orientation.

Architecture

Figure 1B:
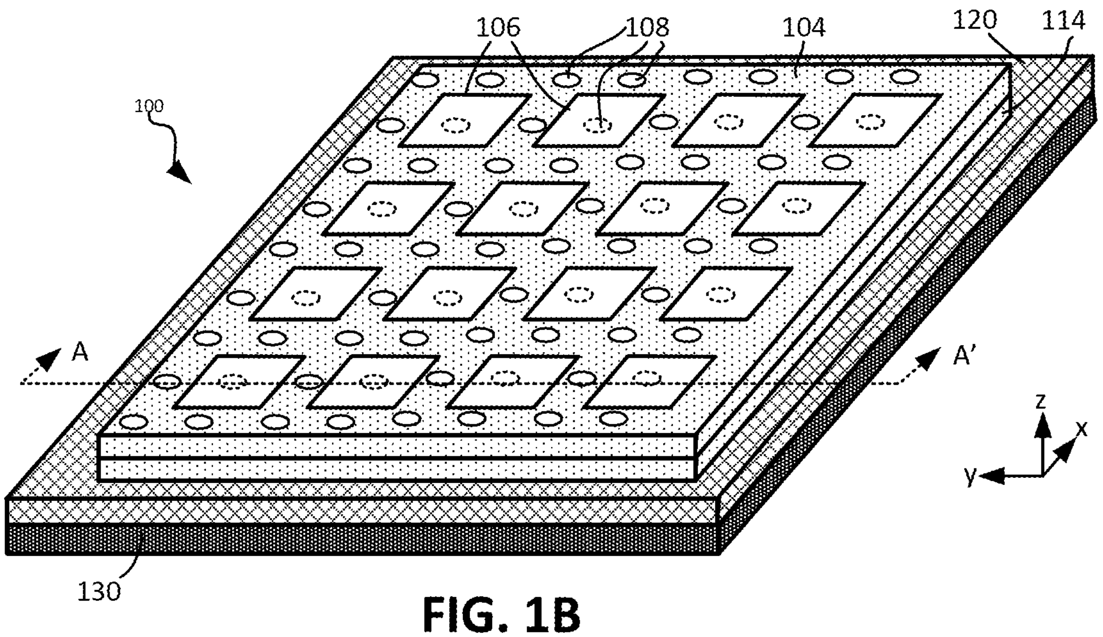
Figure 1C:
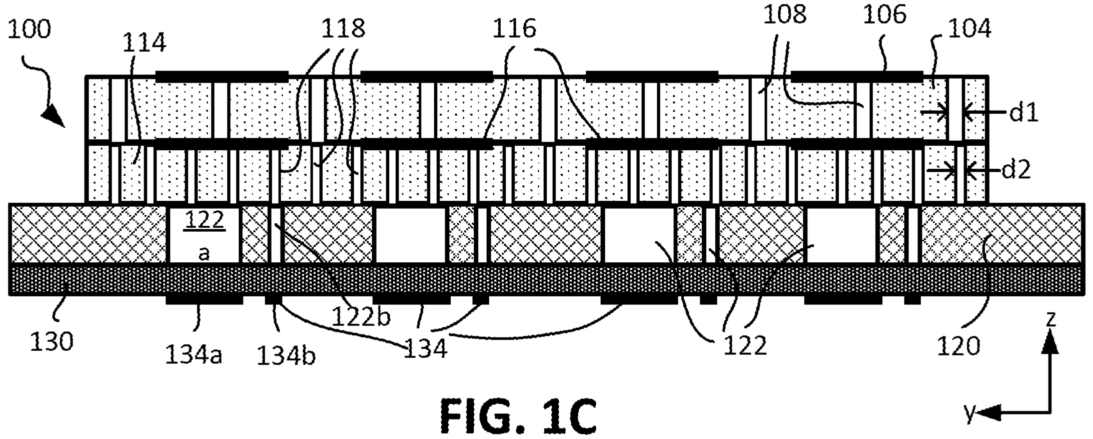

FIG. 1A illustrates an exploded view, 1B illustrates a perspective view, and FIG. 1C illustrates a cross-sectional view of an antenna array 100, wherein the antenna array 100 comprises (i) a first dielectric material 104, with a first plurality of openings or holes 108 extending at least in part within the first dielectric material 104, (ii) a first plurality of patch antennas 106 on the first dielectric material 104, (iii) a second dielectric material 114 below the first dielectric material 104, with a second plurality of openings or holes 118 extending at least in part within the second dielectric material 114, (iv) a second plurality of patch antennas 116 on the second dielectric material 114, and (v) a conductive ground plane 120 below the second dielectric material 114, in accordance with an embodiment of the present disclosure.

Note that in the perspective view of FIG. 1B, the holes 118 within the dielectric material 114 and the patch antennas 116 are covered by the dielectric material 104, and hence, the holes 118 and the patch antennas 116 are not visible in FIG. 1B. The cross-sectional view of FIG. 1C is along line A-A' of FIG. 1B.

Referring to FIGS. 1A-1C, the dielectric material 114 is arranged as a layer above the ground plane 120, and the dielectric material 104 is arranged as a layer above the dielectric material 114. In an example, the dielectric materials 104, 114 are appropriate type of dielectric foam material, although other dielectric materials may also be used, such as an appropriate printed circuit board (PCB) material, FR-4, a composite material comprising woven fiberglass cloth and an epoxy resin binder, glass and/or ceramic material, composite laminate, epoxy, resin, and/or another appropriate dielectric composite material.

In an example, the dielectric materials 104 and 114 may be elementally and/or compositionally the same material, while in another example, the dielectric materials 104 and 114 may be elementally and/or compositionally different material. Thus, in one example, the same foaming material may be used to form the dielectric materials 104 and 114; whereas in another example, different foaming materials may be used to form the dielectric materials 104 and 114.

As illustrated in FIGS. 1A-1C, the holes 108 extend at least in part within the dielectric material 104, and the holes 118 extend at least in part within the dielectric material 114. Note that some of the holes 108 may be below the patch antennas 106, and hence, may not be visible in the exploded and perspective views of FIGS. 1A and 1B-hence, such holes are illustrated using dotted lines in FIGS. 1A and 1B. Similarly, some of the holes 118 may be below the patch antennas 116, and hence, may not be visible in the exploded view of FIG. 1A-hence, such holes are also illustrated using dotted lines in FIG. 1A. The numbers, sizes, and/or locations of the holes 108, 118 in FIGS. 1A-1C are mere examples, and there may be different numbers of such holes, with different sizes and/or locations.

In one embodiment, the dielectric materials 104, 114 (which may be foam, for example) may be porous, e.g., has pores within the respectively dielectric material. Such pores are intrinsic part of the corresponding dielectric material, and may be formed when forming the dielectric materials 104, 114. Note that the holes 108, 118 within the dielectric material 104, 114 are different from such pores. For example, the holes 108, 118 are not intrinsic part of the corresponding dielectric material, and are formed within the dielectric materials 104, 114, respectively, e.g., during or after formation of the dielectric materials 104, 114.

In some examples in which the dielectric materials 104 and/or 114 comprise foams, an average diameter of the holes is substantially larger (e.g., at least 1.2×, or at least 1.5×, or at least 2×, or at least 2.5×, or at least 3×, or at least 4×, or at least 5×) than the an average diameter of the pores. For example, the pores of the dielectric materials 104, 114 may have a diameter of at most 0.1 mm, or at most 0.2 mm, or at most 0.3 mm, or at most 0.4 mm, for example, and the pores may be formed during formation of the dielectric materials 104, 114. In contrast, the holes 108, 118 of the dielectric materials 104, 114, respectively, may be machined or otherwise formed after the formation of the dielectric material is complete, and may have a diameter or width of at least 0.15 mm, or at least 0.2 mm, 0.4 mm, or at least 0.5 mm, or at least 0.6 mm, or at least 0.7 mm, or at least 0.8 mm, or at least 0.9 mm, or at least 1 mm, or at least 2 mm, or at least 3 mm, or at least 4 mm, or at least 5 mm, for example.

In one embodiment, the holes 108 may be substantially uniformly distributed across the dielectric material 104, and the holes 118 may be substantially uniformly distributed across the dielectric material 114, although in another example, the holes may be non-uniformly or haphazardly (e.g., randomly or pseudo-randomly) distributed across the corresponding dielectric material.

In one example, the size and/or density of the holes 108 and the size and/or density of the holes 118 may be substantially similar, whereas in another example they may be different. For example, FIG. 1C illustrates the size and/or density of the holes 108 and the size and/or density of the holes 118 to be different. For example, in FIG. 1C, a hole 108 has a diameter of d1, and a hole 118 has a diameter of d2, where diameters d1 and d2 are measured in a direction that is parallel to a plane of the dielectric materials 104, 114 and a plane of the ground plane 120. As illustrated in the example of FIG. 1C, diameters d1 and d2 may be different. In an example, a density or number of holes 108 within the dielectric material 104 may be different (e.g., higher in the example of FIG. 1C) from a density or number of holes 118 within the dielectric material 114. Thus, for example, the holes 108 may not be aligned with the holes 118, such that a hole 118 may not be below a corresponding hole 118.

However, in another example, the diameters d1 and d2 and/or density (or number) of the holes 108, 118 may be the same. For example, FIG. 1C1 illustrates an alternate example of the antenna array 100 of FIGS. 1A-1C, wherein in FIG. 1C1, a size and/or a density of the first plurality of openings or holes 108 extending at least in part within the first dielectric material 104 is substantially equal to those of the second plurality of openings or holes 118 extending at least in part within the second dielectric material 114, in accordance with an embodiment of the present disclosure. FIG. 1C1 will be apparent, based on the discussion with respect to FIGS. 1A-1C.

In an example, a hole extends within and through a corresponding dielectric material. For example, as illustrated in FIG. 1C, a hole 108 extends from an upper surface of the dielectric material 104 to a lower surface of the dielectric material 104. Similarly, a hole 118 extends from an upper surface of the dielectric material 114 to a lower surface of the dielectric material 114.

However, in another example, a hole may extend partially, but not fully, through the corresponding dielectric material. FIG. 1C2 illustrates another alternate example of the antenna array 100 of FIGS. 1A-1C, wherein in FIG. 1C2, the first plurality of features 108 extend partially, and not fully, through the first dielectric material 104, and the second plurality of features extend partially, and not fully, through the second dielectric material 114, in accordance with an embodiment of the present disclosure. Note that a hole, as used herein, may be a type of a feature that may be machined or otherwise formed within the dielectric material. A feature, as used herein, may be a void or opening machined or otherwise formed within the dielectric material, and may have any appropriate geometrical shape and size, such as (i) the holes illustrated in FIGS. 1C and 1C1, or (ii) may be shaped or sized differently from a hole, as illustrated in FIG. 1C2. Holes are primarily used herein for description, and such description may also be applicable to other features as well, such as those illustrated in FIG. 1C2, unless otherwise stated.

For example, in FIG. 1C2, some of the features 108 extend from a lower surface of the dielectric material 104 towards the upper surface of the dielectric material 104, but doesn't extend up to the upper surface of the dielectric material 104; and some other features 108 extend from the upper surface of the dielectric material 104 towards the lower surface of the dielectric material 104, but doesn't extend up to the lower surface of the dielectric material 104. The features 108 may be holes or any appropriately shaped voids or openings filled with gas (such as air) or vacuum.

Similarly, in FIG. 1C2, some of the features 118 extend from an upper surface of the dielectric material 114 towards the lower surface of the dielectric material 114, but doesn't extend up to the lower surface of the dielectric material 114. Also, remaining features 118 may extend from the lower surface of the dielectric material 114 towards the upper surface of the dielectric material 114, but may not extend up to the upper surface of the dielectric material 114. FIG. 1C2 will be apparent, based on the discussion with respect to FIGS. 1A-1C.

Figure 3:
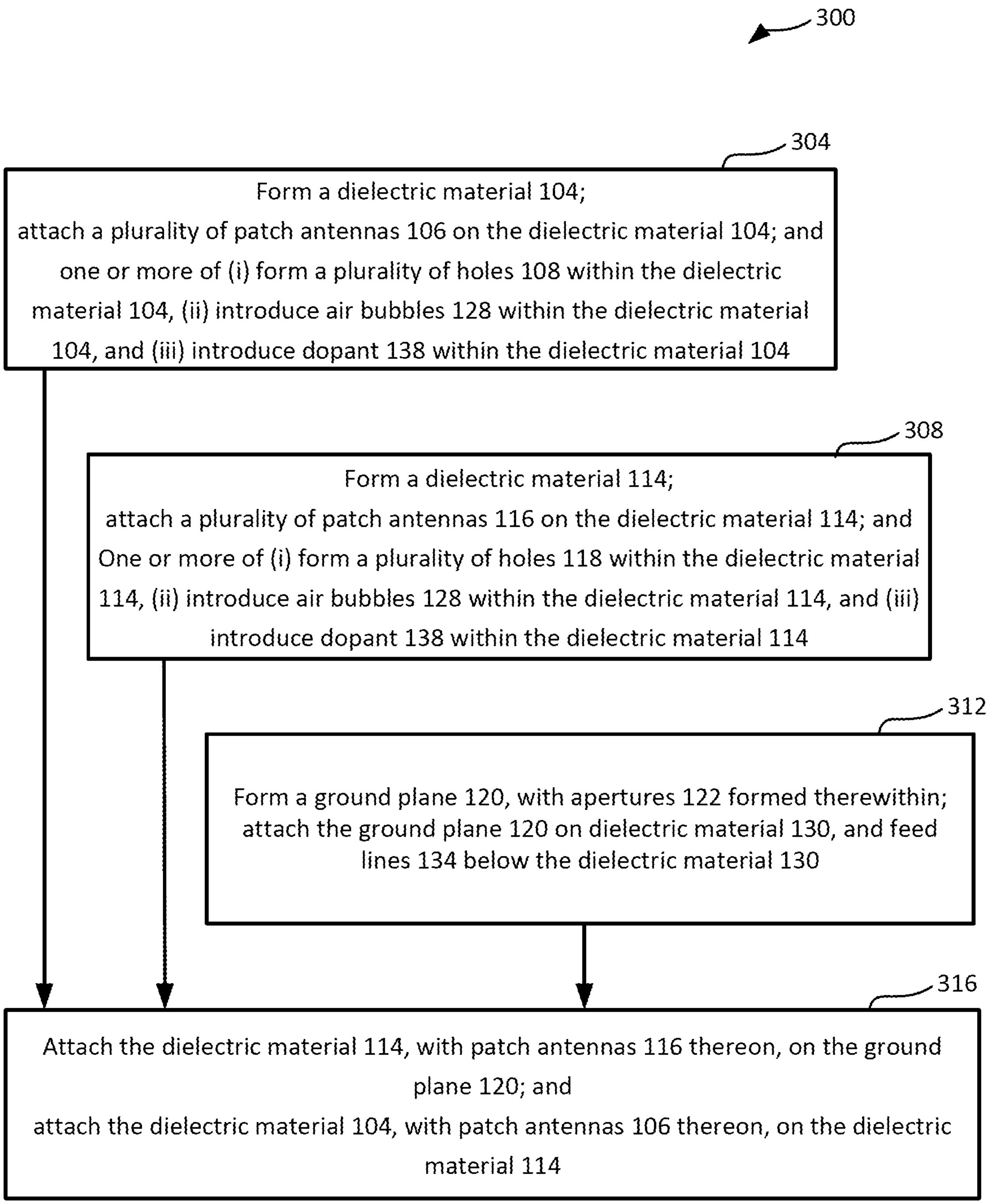

FIG. 1C3 illustrates another alternate example of the antenna array 100 of FIGS. 1A-1C, wherein in FIG. 1C3, a plurality of air bubbles 128 are intentionally introduced within the first dielectric material 104 and the second dielectric material 114, in accordance with an embodiment of the present disclosure. The air bubbles 128 may have smaller width or diameters than the holes or features 108, 118. In an example, the air bubbles 128 may be present in addition to, or instead of, the holes or features 108, 118. In an example, the intentionally introduced air bubbles 128 may be used to tune an effective dielectric constant of the dielectric materials 104, 114. The air bubbles 128 are pores filled with gas, such as air. If the antenna array 100 is operated in a vacuum environment, the air bubbles 128 will be voids or pores including vacuum. The locations and number of air bubbles 128 illustrated in FIG. 1C3 are mere examples.

FIG. 1C4 illustrates another alternate example of the antenna array 100 of FIGS. 1A-1C, wherein in FIG. 1C4, the first dielectric material 104 and the second dielectric material 114 are doped with a dopant 138, in accordance with an embodiment of the present disclosure. In an example, the dielectric materials 104, 114 are dielectric foam, epoxy, or another appropriate dielectric material, and the dopant 138 is carbon. In an example, the dopant 138 is a dielectric material that is elementally and/or compositionally different from the dielectric materials 104, 114. In an example, a type and/or a concentration of the dopant 138 may be tuned or chosen, or tune an effective dielectric constant of the dielectric materials 104, 114. The locations and number of the dopants 138 illustrated in FIG. 1C3 are mere examples.

Referring again to FIGS. 1A-1C, the structure 100 comprises the patch antennas 106 on the dielectric material 104, and the patch antennas 116 on the dielectric material 114. In one embodiment, each of the patch antennas 106, 116 comprises a conductive material (such as metal, for example, copper), or a non-conductive material least partially plated with a conductive material (e.g., a metal plating). As illustrated in FIGS. 1A and 1B, in an example, each of the patch antennas 106, 116 is in the shape of a square, another other shape may also be possible, such as a circle or a rhombus. In an example, individual patch antenna may be attached to an upper surface of the corresponding dielectric material using, for example, an adhesive layer (not illustrated in FIGS. 1A-1C).

In an example, a patch antenna 106 of the plurality of patch antennas 106 is above a corresponding patch antenna 116 of the plurality of patch antennas 116. For example, of the plurality of patch antennas 106, a specific patch antenna 106*a* is labelled in FIG. 1A. Similarly, of the plurality of patch antennas 116, a specific patch antenna 116*a* is labelled in FIG. 1A.

Figure 1D:
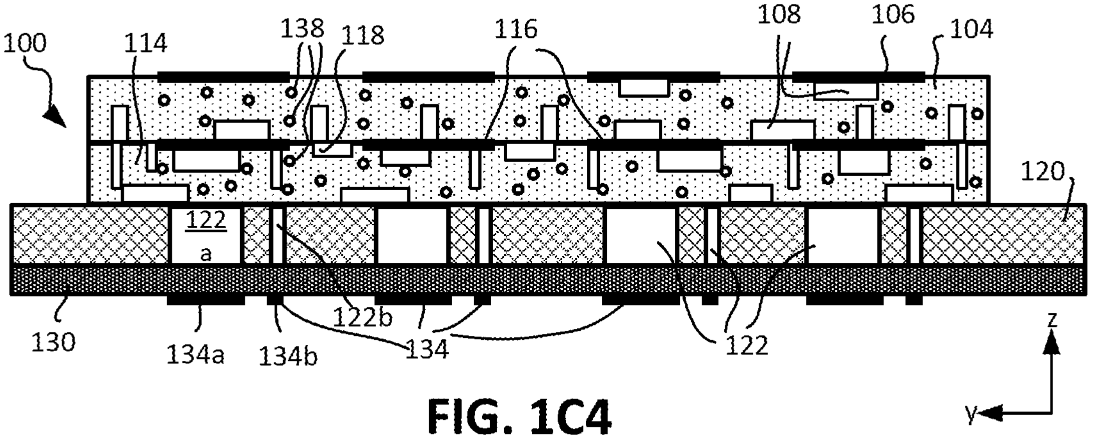
FIG. 1D illustrates a single antenna structure of the antenna array of FIGS. 1A-1C2, in accordance with an embodiment of the present disclosure.
Figure 1D:
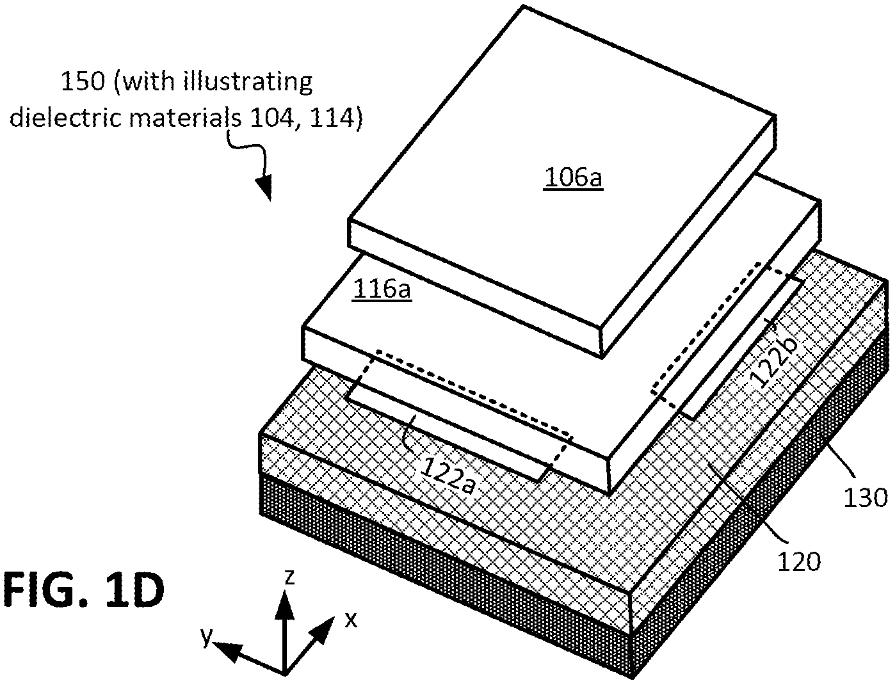

In one embodiment, the patch antennas 106*a* and 116*a* form, along with various other components, a unit or single antenna structure 150. For example, FIG. 1D illustrates a single antenna structure 150 of the antenna array 100 of FIGS. 1A-1C, in accordance with an embodiment of the present disclosure. Thus, the antenna structure 150 comprises a corresponding vertical stack of patch antennas 106*a*, 116*a* above the ground plane 120. Note that the dielectric materials 104, 114 and the corresponding holes therewithin are not illustrated in FIG. 1D, for purposes of illustrative clarity.

As illustrated, in the antenna structure 150, the patch antenna 116*a* is above the ground plane 120 (and separated from the ground plane by the dielectric material 114, not illustrated in FIG. 1D). Similarly, the patch antenna 106*a* is above the patch antenna 116*a* (and separated from the patch antenna 116*a* by the dielectric material 104, not illustrated in FIG. 1D).

Also illustrated are outlines of apertures or openings 122*a*, 122*b* within the ground plane 120, where the apertures 122*a*, 122*b* are at least in part below the patch antennas 106*a* and 116*a* (the apertures 122*a*, 122*b* are described below). Note that the apertures 122*a*, 122*b* are below the patch antenna 116*a*, and hence, would not be fully visible in the perspective view of FIG. 1D (e.g., would be covered by the patch antenna 116*a*) (sections of the apertures covered by the patches are illustrated in dotted lines in FIG. 1D). Accordingly, the apertures 122*a*, 122*b* are illustrated using dotted lines in FIG. 1D.

In an example, the antenna array 100 comprises an array of antenna structures, each of which may be at least in part similar to the antenna structure 150 of FIG. 1D.

Referring again to FIGS. 1A-1C, the ground plane 120 is below the array of patch antennas 106 and 116. The ground plane 120 comprises material is at least partially electrically conductive (e.g., is all metal or at least partially metal). In some other examples, the material of the ground plane 120 is at least partially non-conductive and at least partially plated with another conductive material (e.g., a metal plating). In an example, the ground plane 120 comprises a metal such as copper or another appropriate metal, and/or an alloy thereof.

In one embodiment, the ground plane 120 includes a plurality of aperture slots 122. The aperture slots are cut into the ground plane 120. Thus, an aperture slot 124 is a hole or an opening that extends through the ground plane 120. Note that inner sidewalls of individual aperture slots are not illustrated in the perspective and exploded views of FIGS. 1A and 1B, for purposes of illustrative clarity.

The aperture slots 122 are arranged in pairs, such as aperture slots 122*a* and 122*b* that are specifically labeled in FIG. 1A and also illustrated in FIG. 1D. For example, each antenna structure of the antenna array 100 (such as the antenna structure 150 of FIG. 1D) has two corresponding aperture slots, e.g., corresponding to two polarization signals. For example, one of the aperture slots 122*a*, 122*b* is used for vertical polarization signals, and the other of the aperture slots 122*a*, 122*b* is used for horizontal polarization signals. Thus, each vertical stack of patch antennas (such as the vertical stack of patch antennas 106*a*, 116*a*) is above two corresponding aperture slots. Note that in an example where transmission of a single polarization signal is desired, there may be lesser number of aperture slots 122, such that each vertical stack of patch antennas (e.g., patch antennas 116*a* and 106*a* of FIG. 1D) may be above a single corresponding aperture slot.

Although individual aperture slots 122 are illustrated to have a rectangular shape, the aperture slots 122 may have any other appropriate shape, such as a regular or irregular shaped polygon, circle, or oval, for example.

As illustrated in FIGS. 1A-1C, the antenna array 100 also includes a dielectric material 130 below the ground plane 120. In one embodiment, the dielectric material 130 supports the ground plane 120. For example, the dielectric material 130 may be formed in a layer, and the ground plane 120 may be above the layer of the dielectric material 130. In an example, the dielectric material 130 separates the ground plane 120 from feed lines 134 described below.

In an example, the dielectric material 130 is a substrate. In an example, the dielectric material 130 is a printed circuit board (PCB). In an example, the dielectric material 130 comprises an appropriate PCB material. FR-4, a composite material comprising woven fiberglass cloth and an epoxy resin binder, glass and/or ceramic material, composite laminate, foam, epoxy, resin, and/or another appropriate dielectric composite material.

In one embodiment, the antenna array 100 includes a plurality of feed lines 134 below the dielectric material 130, as illustrated in FIGS. 1A and 1C. Some of the feed lines 134 are visible in the exploded view of FIG. 1A and the cross-sectional view of FIG. 1C (the feed lines 134 are not visible in FIG. 1B). In one embodiment, each feed line 134 is associated with a corresponding aperture slot 122. For example, each feed line 134 is below a corresponding aperture slot 122, and separated from the corresponding aperture slot 122 by the dielectric material 130. Thus, each aperture slot 122 has a corresponding feed line 134 below it.

The feed lines 134 are arranged in pairs, such as feed lines 134*a* and 134*b* that are specifically labeled in FIG. 1A. For example, each antenna structure of the antenna array 100 (such as the antenna structure 150 of FIG. 1D) has two corresponding feed lines 134, e.g., corresponding to two polarization signals. For example, in each antenna structure (such as the example antenna structure 150 of FIG. 1D), one of the aperture slots 122*a*, 122*b* and a corresponding one of the feed lines 134*a*, 134*b* is used for vertical polarization signals, and the other of the aperture slots 122*a*, 122*b* and the corresponding one of the feed lines 134*a*, 134*b* is used for horizontal polarization signals. Thus, each vertical stack of patch antennas (such as the vertical stack of patch antennas 106*a*, 116*a*) is above two corresponding feed lines (such as feed lines 134, 134*b*).

Note that in an example where transmission of a single polarization signal is desired, there may be lesser number of feed lines 134, such that each vertical stack of patch antennas may be above a single corresponding feed line. Although individual feed lines 134 are illustrated to have a cross-shaped structure, the feed lines may have any other appropriate shape. The feed lines 134 comprise conductive material, such as copper and/or one or more other appropriate metals or alloys thereof, or a non-conductive material plated with an electrically conductive material.

In an example, each aperture slot 122 couples the corresponding feed line 134 to the corresponding patch antennas (e.g., aperture slots 122*a*, 122*b* couple the corresponding feed lines 134*a*, 134*b*, respectively, to the corresponding patch antennas 116*a*, 106*a* of the antenna structure 150 of FIG. 1D), and cause to excite the patch antennas, thereby causing transmission of RF signals by the antenna structure 150. Thus, the antenna array 100 is an aperture fed antenna system. Note that the antenna array 100 is illustrated to include aperture fed patch antenna structures, although the antenna array 100 may be of another appropriate type, such as probe feed antenna structure.

FIG. 2A illustrates a graph 200 depicting a relationship between a filling ratio of one or both the first dielectric material 104 and the second dielectric material 114 of FIGS. 1A-1C versus an effective dielectric constant of the dielectric material (e.g., with holes therewithin), wherein the filling ratio can be tuned by tuning formation of holes within the dielectric material, in accordance with an embodiment of the present disclosure. The X-axis of the graph 200 represents filling ratio of the dielectric material (such as the dielectric materials 104 and/or 114) under consideration, and the Y-axis of the graph 200 represents the corresponding effective dielectric constant of the dielectric material.

In an example, the filling ratio can be defined as:

Filling ratio = (a volume of dielectric material)/(total volume of the dielectric material and the holes therewithin)  Equation 1

Note that the total volume of the dielectric material and the holes there within is constant. e.g., irrespective of a number of holes or sizes of holes formed within the dielectric material. Thus, the denominator of equation 1 doesn't change with new holes or bigger sized holes being formed within the dielectric material. However, the numerator of equation 1 decreases with new holes or bigger sized holes being formed within the dielectric material, resulting in a decrease of the filling ratio.

As illustrated in FIG. 2A, the filling ratio may vary between 0 and 1, where a filling ratio of 1 corresponds to no holes being formed within the dielectric material (e.g., numerator and denominator of equation 1 are equal). Thus, filling ratio of 1 corresponds to the dielectric material formed without any holes (although the dielectric material may have pores that are intrinsic to the dielectric material). Thus, filling ratio of 1 corresponds to the original or intrinsic dielectric material.

As and when more holes are formed within the dielectric material and/or sizes of the holes within the dielectric material increases, the filing ratio decreases. For example, in an extreme case when the holes consume entirety of the dielectric material (e.g., no dielectric material is any longer present), this corresponds to a filling ratio of 0, during which the effective dielectric constant is 1 that is of the air (e.g., when numerator of equation 1 is zero).

The line 204 of graph 200 illustrates a relationship between the filling ratio and the effective dielectric constant of the dielectric material (e.g., with holes therewithin). For example, filling ratio of 1 corresponds to the original or intrinsic dielectric material, with no holes formed therewithin. For example, the dielectric constant of the dielectric material, without any holes therewithin, is indicated to be Pa in FIG. 2A, where the dielectric constant Pa is the intrinsic dielectric constant of the dielectric material without any holes therewithin.

As and when a number and/or a size of holes within the dielectric material increases, the filling ratio decreases (see equation 1 above). This results in portions of the dielectric material being replaced by air (e.g., the holes are occupied by air, for example). This results in a corresponding decrease in the effective dielectric constant, e.g., due to the formation of the holes. In the extreme case where the filling ratio is 0, the entire dielectric material is replaced by holes or air, resulting in a dielectric constant of 1, which is the dielectric constant of air.

Thus, in one embodiment, the effective dielectric constant of dielectric materials 104 and/or 114 of the antenna array 100 may be controller by forming holes within the corresponding dielectric material, where the number and/or size of the holes can be tuned to achieved a desired filling ratio, and hence, a desired effective dielectric constant of the dielectric material. For example, referring to FIG. 2A, if an effective dielectric constant of Pb for the dielectric material 104 is desired, then holes are to be formed within the dielectric material 104 such that the filling ratio is about 0.6.

Figure 2B:
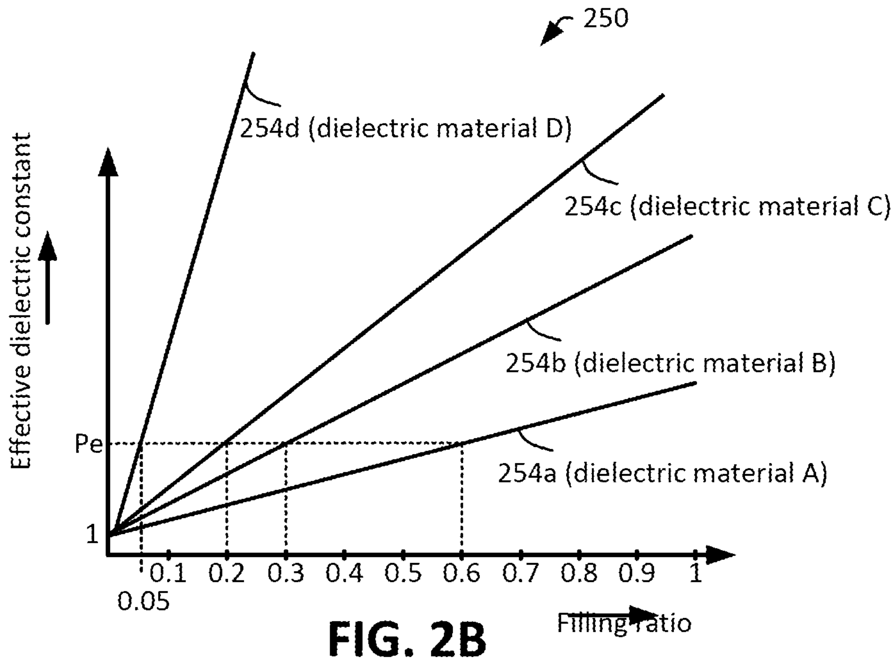
FIG. 2B illustrates a graph depicting, for four example dielectric materials (A, B, C, and D), corresponding relationships between a filling ratio of the corresponding dielectric material versus an effective dielectric constant of the corresponding dielectric material (e.g., with holes therewithin), in accordance with an embodiment of the present disclosure.

FIG. 2B illustrates a graph 250 depicting, for four example dielectric materials A, B, C. and D, corresponding relationships between a filling ratio of the corresponding dielectric material versus an effective dielectric constant of the corresponding dielectric material (e.g., with holes therewithin), in accordance with an embodiment of the present disclosure. Similar to FIGS. 2A, in FIG. 2B The X-axis of the graph 250 represents filling ratio of the dielectric materials under consideration, and the Y-axis represents the corresponding effective dielectric constant of the dielectric materials.

The line 254*a* corresponds to the dielectric material A, the line 254*b* corresponds to the dielectric material B, the line 254*c* corresponds to the dielectric material C, and the line 254*d* corresponds to the dielectric material D. The dielectric materials A, . . . , D may be any appropriate dielectric materials usable in the antenna array 100. In an example, one or more of the dielectric materials A, . . . , D may be different types of dielectric foams.

In an example, as illustrated in FIG. 2B, an effective dielectric constant of Pe may be achieved by using any of (i) the dielectric material A with a filing ratio of about 0.6; (ii) the dielectric material B with a filing ratio of about 0.3; (iii) the dielectric material C with a filing ratio of about 0.2, or (iv) the dielectric material D with a filing ratio of about 0.05, for example.

It may be noted that for a relatively low filling ratio, most of the dielectric material is removed, and replaced with holes. For example, for material D, to achieve an effective dielectric constant of Pe, the filling ratio is about 0.05, implying that about 95% of the dielectric material is removed and replaced with holes.

As illustrated in FIGS. 1A-1C, the dielectric materials 104, 114 structurally supports the patch antennas 106, 116, respectively. Thus, the dielectric materials 104, 114 with relatively low filling ratio may not have sufficient mechanical stability or strength to structurally support the patch antennas 106, 116, respectively. Accordingly, in the example of FIG. 2B, to achieve the dielectric constant of Pe, the dielectric material D (and maybe the dielectric material C as well, e.g., depending on a weight and support required by the patch antennas) may not be a practical choice for the dielectric materials 104 and/or 114 of the antenna array 100, as with such a low filling ratio, the dielectric material D, when used as the dielectric materials 104 and/or 114, may not be able to satisfactorily support the patch antennas 106, 116.

In one embodiment, the antenna array 100 may be scaled across the frequency spectrum, e.g., by choosing a dielectric material and a corresponding filling ratio for use as the dielectric materials 104 and/or 114 of the antenna array 100. For example, a frequency spectrum of the antenna array 100 is based at least in part of the effective dielectric constant of the dielectric materials 104 and/or 114. Thus, changing the effective dielectric constant of the dielectric materials 104 and/or 114 may impact a bandwidth of the antenna array 100. In some examples, lowering the effective dielectric constant of the dielectric materials 104 and/or 114 may improve, or otherwise change, a bandwidth of the antenna array 100. Also, as discussed with respect to FIGS. 2A and 2B, the effective dielectric constant of the dielectric materials 104 and/or 114 may be controlled by controlling the filling ratio of the corresponding dielectric material. In another example, pores, such as air bubbles, within the dielectric material and/or dopant within the dielectric material may also be used to tune or adjust the dielectric constant of the dielectric materials 104 and/or 110. In an example, a number and/or size of holes perforated within the dielectric materials 104 and/or 114 may be customized, to tune or adjust the frequency spectrum or bandwidth of the antenna array 100, while maintaining a minimum or threshold level of filling ratio for mechanical or structural stability of the dielectric material (e.g., such that the dielectric material is able to effectively support the patch antennas thereon). Furthermore, the holes within the dielectric materials 104 and/or 114 reduce weight of the antenna assembly 100, which may be advantageous in applications in which total weight of the antenna array 100 may be a concern.

Method of Manufacturing

FIG. 3 illustrate a flowchart depicting a method 300 of forming the example antenna array 100 of FIGS. 1A-1D, in accordance with an embodiment of the present disclosure. FIGS. 4A, 4B, 4C, and 4D collectively illustrate an example antenna array (e.g., the antenna array 100 of FIGS. 1A-1D) in various stages of processing in accordance with the methodology 300 of FIG. 3, in accordance with an embodiment of the present disclosure. FIGS. 3 and 4A-4D will be discussed in unison.

Referring to the method 300 of FIG. 3, processes 304, 308, and 312 are performed. These processes 304, 308, 312 may be performed independent of each other, e.g., in any temporal order, and may be performed at least in part simultaneously.

Figure 4A:
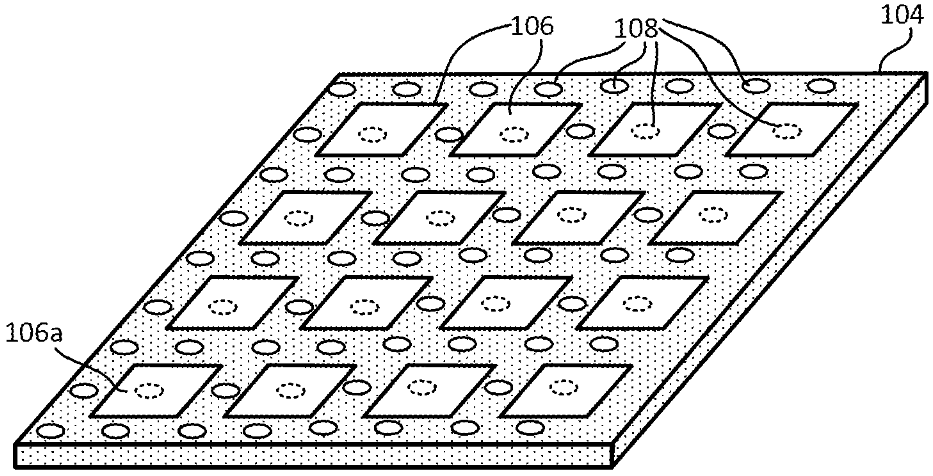
FIGS. 4A, 4B, 4C, and 4D collectively illustrate an example antenna array in various stages of processing in accordance with the methodology of FIG. 3, in accordance with an embodiment of the present disclosure.

At process 304, a dielectric material 104 is formed, a plurality of patch antennas 106 is attached on the dielectric material 104. Furthermore, one or more of the following are performed: (i) form a plurality of holes 108 within the dielectric material 104, as illustrated in FIG. 4A, (ii) introduce air bubbles 128 within the dielectric material 104, as described with respect to FIG. 1C3, and (iii) introduce dopant 138 within the dielectric material 104, as described with respect to FIG. 1C4.

In some examples, the dielectric material 104 is a dielectric foam. In some such examples, the dielectric material 104 may be formed using an appropriate foaming process to form the dielectric foam material. Merely as an example, during the foaming process, a mixture of an activator and a foaming portion may be deposited, and then the foaming mixture may be cured at an appropriate temperature, such that rigid foam forms from the activator and the foaming portion. In another example, a foaming gel or solution may be applied and then cured, to form a rigid foam. In yet another example, a foaming power (e.g., comprising microspheres including resins or another appropriate material) is applied and then cured at an appropriate temperature, such that the foaming power transforms to the rigid dielectric foam. Any appropriate foaming process can be used to form the dielectric foam 104, and the selection of the foaming process and/or the selection of an appropriate type of foam may be implementation specific.

In one embodiment, the holes 108 may be machined or drilled within the dielectric material 104, e.g., using a computerized numerical control (CNC) machining process, or another appropriate machining process. As discussed with respect to FIGS. 1C and 1C2, the holes 108 may extend fully (e.g., see FIG. 1C) or only partially (e.g., see FIG. 1C2) within the dielectric material 104. The number and/or diameters of the holes 108 may be to pre-selected, e.g., achieve a desired filling ratio, which may correspond to a desired effective dielectric constant of the dielectric material 104, as described above.

In an example, the air bubbles 128 may be introduced when forming the dielectric material 104. For example, an appropriate blowing agent may be used to form the air bubbles 128. A blowing agent is capable of producing a dielectric material through a foaming process that undergo hardening or phase transition. The foaming agent may be applied when the blown material is in a liquid stage. When cured, the foaming agent entraps air or gases within the dielectric material, to thereby form bubbles within the dielectric material 104.

In an example, the dielectric material 104 may be doped with the dopant 138 using an appropriate doping technique. Example dopants have been described above.

In some examples, the patch antennas 106 are attached (e.g., using an adhesive layer) on the dielectric material 104 subsequent to the holes 108 being formed within the dielectric material 104, and/or the dopants 138 and/or air bubbles being introduced within the dielectric material 104. In some such examples, the formation of the holes 108 and/or doping the dielectric material 104 may be from an upper surface or a lower surface of the dielectric material 104, where the patch antennas 106 are on the upper surface of the dielectric material 104.

In some other examples, the patch antennas 106 are attached on the dielectric material 104 prior to the holes 108 being formed within the dielectric material 104, and/or prior to the dopants 138 and/or air bubbles being introduced within the dielectric material 104. In some such examples, the formation of the holes 108 and/or doping the dielectric material 104 may be from the lower surface of the dielectric material 104, where the patch antennas 106 are on the upper surface of the dielectric material 104.

Figure 4B:
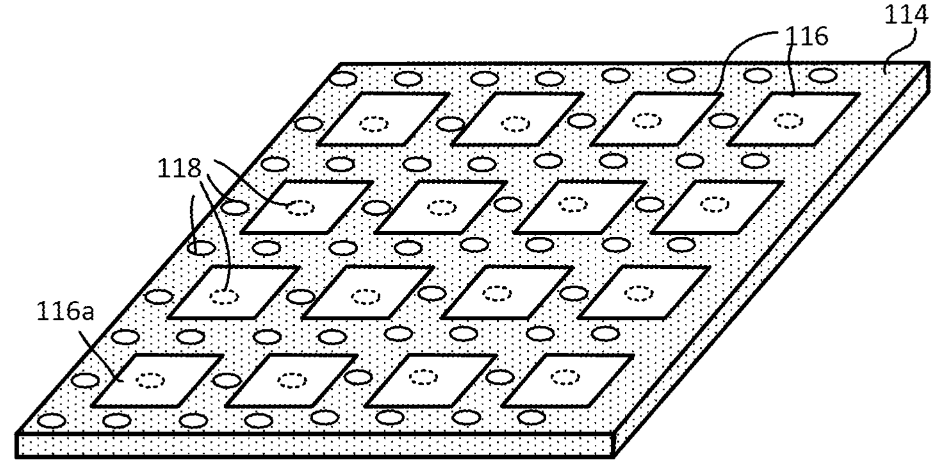

The method 300 also includes process 308. At 308, a dielectric material 114 is formed, a plurality of patch antennas 116 is attached on the dielectric material 114. Furthermore, one or more of (i) and a plurality of holes 118 is formed within the dielectric material 114, as illustrated in FIG. 4B, (ii) air bubbles 128 are introduced within the dielectric material 114, and (iii) dopant 138 are doped within the dielectric material 114. The description with respect to the process 304 may also applies to the process 308, and hence, process 308 will be apparent based on the description with respect to process 304.

Figure 4C:
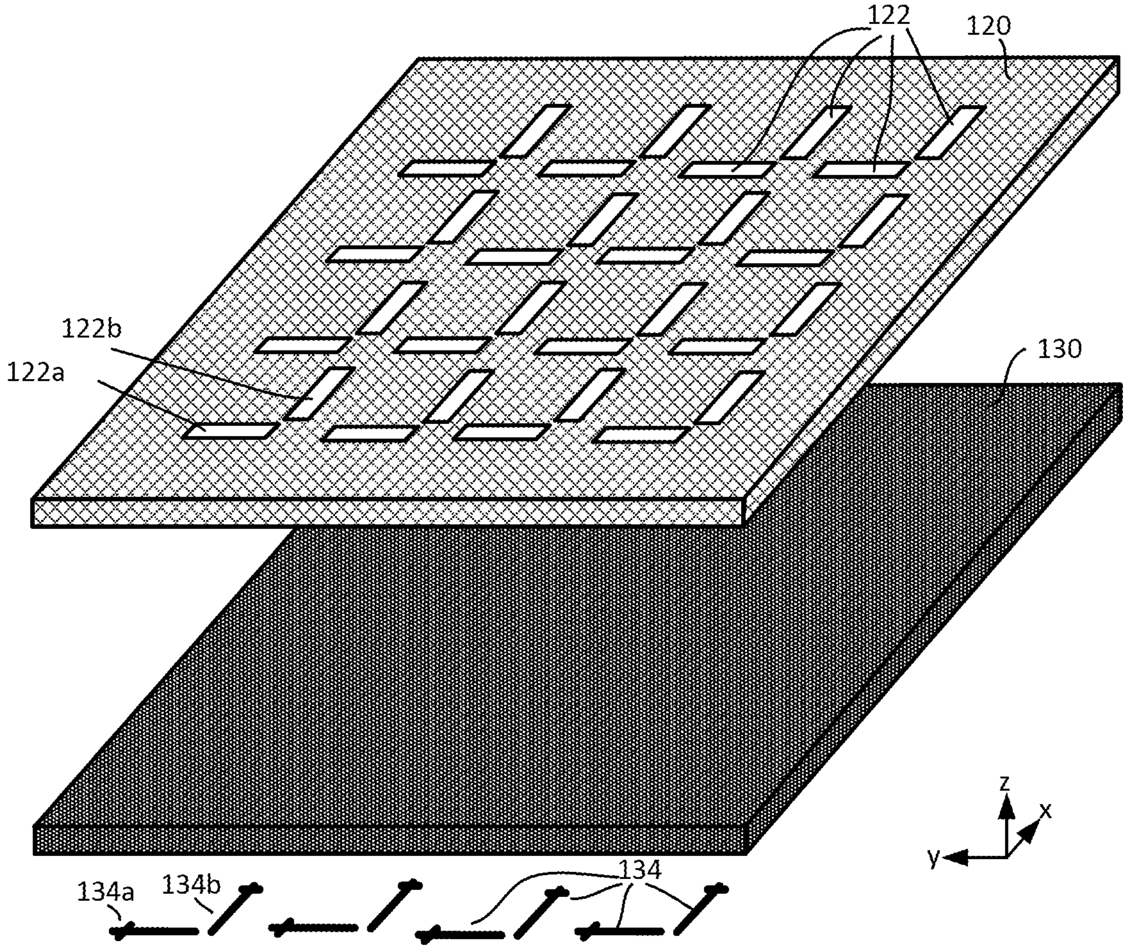

The method 300 also includes process 312. At 312, a ground plane 120 is formed, as illustrated in FIG. 4C. In an example, apertures 122 are formed within the ground plane 120. For example, the apertures 122 may be machined within the ground plane 120 (e.g., through a subtractive process). In another example, the ground plane 120 may be formed using an additive manufacturing process, such as a three-dimensional (3D) printing process, along with the apertures 122 therewithin. Also, at 312, the ground plane 120 is attached (e.g., using an adhesive) on dielectric material 130, and feed lines 134 are attached below the dielectric material 130.

Figure 4D:
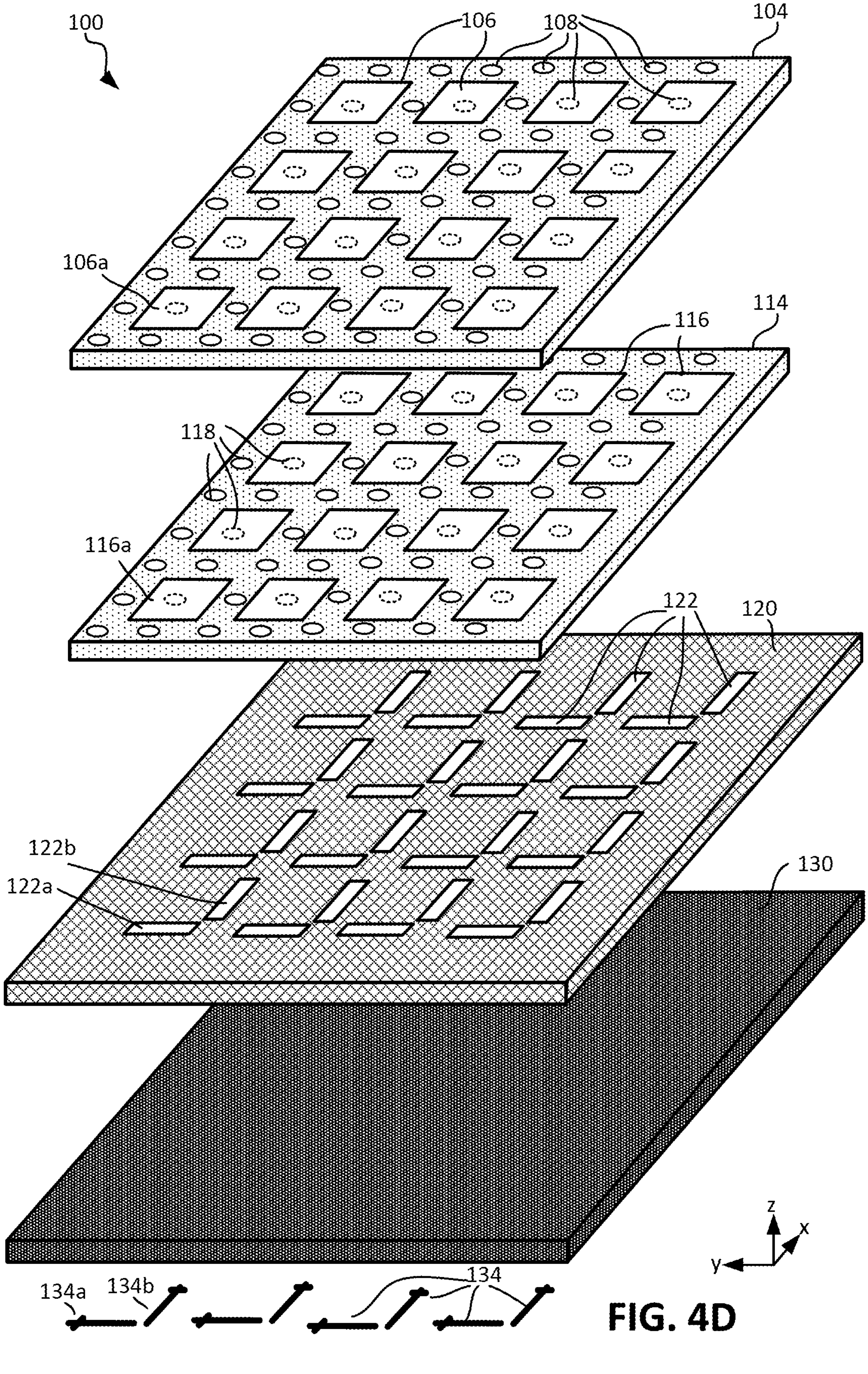

From processes 304, 308, and 312, the method 300 proceeds to 316. At 316, the dielectric material 114, with holes 118, air bubbles 128, and/or dopants 138 therewithin and patch antennas 116 thereon, is attached (e.g., using adhesive) on the ground plane 120; and the dielectric material 104, with holes 108, air bubbles 128, and/or dopants 138 therewithin and patch antennas 106 thereon, is attached on the dielectric material 114, where these components are illustrated in the explode view of FIG. 4D. The antenna structure of FIG. 4D is the antenna structure 100 of FIGS. 1A-1D.

Note that the processes in method 300 are shown in a particular order for ease of description. However, one or more of the processes may be performed in a different order or may not be performed at all (and thus be optional), in accordance with some embodiments. Numerous variations on method 300 and the techniques described herein will be apparent in light of this disclosure.

Further Example Examples

The following examples pertain to further examples, from which numerous permutations and configurations will be apparent.

Example 1. An antenna assembly comprising: a ground plane; a dielectric material above the ground plane; and a patch antenna on the dielectric material; wherein at least one of (i) a plurality of features extends from an upper surface or a lower surface of the dielectric material and within the dielectric material, wherein the plurality of features comprises voids filled with gas or are vacuum, and/or (ii) the dielectric material is doped with a dopant.

Example 2. The antenna assembly of example 1, wherein the plurality of features extends from the upper surface or the lower surface of the dielectric material and within the dielectric material, and wherein a feature of the plurality of features has a width of at least 0.15 mm.

Example 3. The antenna assembly of any one of examples 1-2, wherein the dielectric material is doped with the dopant, and wherein the dielectric material is a dielectric foam or epoxy, and the dopant is carbon.

Example 4. The antenna assembly of any one of examples 1-3, wherein the dielectric material is doped with the dopant, wherein the dielectric material is a first dielectric material, and wherein the dopant is a second dielectric material that is elementally and/or compositionally different from the first dielectric material.

Example 5. The antenna assembly of any one of examples 1-4, wherein the dielectric material comprises a dielectric foam.

Example 6. The antenna assembly of any one of examples 1-5, wherein the dielectric material is a first dielectric material, the patch antenna is a first patch antenna, the plurality of features are a first plurality of features, the dopant is a first dopant, and wherein the antenna assembly further comprises: a second dielectric material above the first patch antenna; and a second patch antenna on the second dielectric material; wherein at least one of (i) a second plurality of features extends from an upper surface or a lower surface of the second dielectric material and within the second dielectric material, wherein the second plurality of features comprise voids filled with gas or are vacuum, and/or (ii) the second dielectric material is doped with a second dopant.

Example 7. The antenna assembly of any one of examples 1-6, wherein a feature of the plurality of features extends from the upper surface of the dielectric material to the lower surface of the dielectric material.

Example 8. The antenna assembly of any one of examples 1-7, wherein a feature of the plurality of features extends from one of the upper or lower surfaces of the dielectric material and within the dielectric material, and doesn't extend up to the other of the upper or lower surfaces of the dielectric material.

Example 9. The antenna assembly of any one of examples 1-8, further comprising: a first aperture and a second aperture on the ground plane, the first and second apertures below the patch antenna; another dielectric material below the first and second apertures; and a first feed line below the first aperture, and a second feed line below the second aperture, the first and second feed lines separated from the first and second apertures, respectively, by the other dielectric material.

Example 10. A method of forming an antenna assembly, comprising: forming a dielectric material; attaching a patch antenna on the dielectric material; performing at least one of (i) forming a plurality of holes within the dielectric material, (ii) doping the dielectric material with a dopant, and (iii) introducing air bubbles within the dielectric material; and subsequent to said performing, placing the dielectric material, with the patch antenna thereon, above a ground plane.

Example 11. The method of example 10, wherein said performing comprises forming the plurality of holes within the dielectric material, and wherein forming the plurality of holes within the dielectric material comprises forming the plurality of holes within the dielectric material prior to attaching the patch antenna to the dielectric material.

Example 12. The method of any one of examples 10-11, wherein said performing comprises forming the plurality of holes within the dielectric material, and wherein forming the plurality of holes within the dielectric material comprises forming the plurality of holes within the dielectric material subsequent to attaching the patch antenna to the dielectric material.

Example 13. The method of any one of examples 10-12, wherein said performing comprises forming the plurality of holes within the dielectric material, and wherein forming the plurality of holes within the dielectric material comprises machining the plurality of holes within the dielectric material.

Example 14. The method of any one of examples 10-13, wherein said performing comprises doping the dielectric material with the dopant, wherein the dielectric material comprises a dielectric foam or epoxy, and wherein the dopant is carbon.

Example 15. The method of any one of examples 10-14, wherein said performing comprises introducing air bubbles within the dielectric material, and wherein introducing air bubbles within the dielectric material comprises: while forming the dielectric material, introducing a blowing agent that, when cured, results in formation of the air bubbles within the dielectric material.

Example 15a. The method of any one of examples 10-15, wherein a diameter of a hole of the plurality of holes is at least 0.125 mm, and wherein the dielectric material comprises a foam.

Example 16. The method of any one of examples 10-15a, wherein the dielectric material is a first dielectric material, the patch antenna is a first patch antenna, the plurality of holes is a first plurality of holes, and wherein the method further comprises: forming a second dielectric material; attaching a second patch antenna on the second dielectric material; performing at least one of (i) forming another plurality of holes within the second dielectric material, (ii) doping the second dielectric material with another dopant, and (iii) introducing air bubbles within the second dielectric material; and placing the second dielectric material above the first dielectric material.

Example 17. The method of any one of examples 10-16, wherein: an opening of a first hole of the plurality of holes is covered by the patch antenna; and an opening of a second hole of the plurality of holes is not covered by any patch antenna.

Example 18. The method of any one of examples 10-17, wherein: a hole of the plurality of holes extends from a first surface of the dielectric material, through the dielectric material, and towards an opposing second surface of the dielectric material; the hole either extends up to, or doesn't extend up to, the second surface of the dielectric material; and the patch antenna is on either the first surface or the second surface of the dielectric material.

Example 19. An antenna assembly comprising: a foam material; and a plurality of patch antennas on the foam material; wherein a plurality of holes extends at least in part within the foam material, wherein an opening of a first hole of the plurality of holes is covered by a patch antenna of the plurality of patch antennas, and wherein an opening of a second hole of the plurality of holes is not covered by any patch antenna.

Example 20. The antenna assembly of example 19, wherein the foam material is a first foam material, the plurality of patch antennas is a first plurality of patch antennas, the plurality of holes is a first plurality of holes, and wherein the antenna assembly further comprises: a second foam material above the first foam material and the first plurality of patch antennas thereon; and a second plurality of patch antennas on the second foam material; wherein a second plurality of holes extends at least in part within the second foam material, wherein an opening of a third hole of the second plurality of holes is covered by another patch antenna of the second plurality of patch antennas, and wherein an opening of a fourth hole of the second plurality of holes is not covered by any patch antenna.

Numerous specific details have been set forth herein to provide a thorough understanding of the examples. It will be understood, however, that other examples may be practiced without these specific details, or otherwise with a different set of details. It will be further appreciated that the specific structural and functional details disclosed herein are representative of examples and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. Furthermore, examples described herein may include other elements and components not specifically described, such as electrical connections, signal transmitters and receivers, processors, or other suitable components for operation of the antenna system 100.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and examples have been described herein. The features, aspects, and examples are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An antenna assembly comprising:

a ground plane;

a lower dielectric material above the ground plane;

an upper dielectric material above the lower dielectric material;

a lower patch antenna on the dielectric material;

an upper patch antenna on the upper dielectric material;

a first aperture and a second aperture on the ground plane, the first and second apertures below the patch antenna, wherein one of the first or second apertures is configured to transmit vertically polarized signals and wherein the other of the first or second apertures is configured to transmit horizontally polarized signals;

another dielectric material below the first and second apertures; and a first feed line below the first aperture, and a second feed line below the second aperture, the first and second feed lines separated from the first and second apertures, respectively, by the other dielectric material;

wherein at least one of (i) a plurality of features extends from an upper surface or a lower surface of the lower dielectric material and/or the upper dielectric material and within the lower dielectric material and/or the upper dielectric material, wherein the plurality of features comprises voids filled with gas or are vacuum, and/or (ii) the lower dielectric material and/or the upper dielectric material is doped with a dopant.

2. The antenna assembly of claim 1, wherein the plurality of features extends from the upper surface or the lower surface of the lower and/or upper dielectric material and within the lower and/or upper dielectric material, and wherein a feature of the plurality of features has a width of at least 0.15 mm.

3. The antenna assembly of claim 1, wherein the lower and/or upper dielectric material is doped with the dopant, and wherein the lower and/or upper dielectric material is a dielectric foam or epoxy, and the dopant is carbon.

4. The antenna assembly of claim 1, wherein the lower and/or upper dielectric material is doped with the dopant, wherein the lower and/or upper dielectric material is a first dielectric material, and wherein the dopant is a second dielectric material that is elementally and/or compositionally different from the first dielectric material.

5. The antenna assembly of claim 1, wherein the lower and/or upper dielectric material comprises a dielectric foam.

6. The antenna assembly of claim 1, wherein the lower and/or upper dielectric material is a first dielectric material, the patch antenna is a first patch antenna, the plurality of features are a first plurality of features, the dopant is a first dopant, and wherein the antenna assembly further comprises:

a second dielectric material above the first patch antenna; and a second patch antenna on the second dielectric material;

wherein at least one of (i) a second plurality of features extends from an upper surface or a lower surface of the second dielectric material and within the second dielectric material, wherein the second plurality of features comprise voids filled with gas or are vacuum, and/or (ii) the second dielectric material is doped with a second dopant.

7. The antenna assembly of claim 1, wherein a feature of the plurality of features extends from the upper surface of the lower and/or upper dielectric material to the lower surface of the respective lower and/or upper dielectric material.

8. The antenna assembly of claim 1, wherein a feature of the plurality of features extends from one of the upper or lower surfaces of the lower and/or upper dielectric material and within the lower and/or upper dielectric material, and doesn't extend up to the other of the upper or lower surfaces of the lower and/or upper dielectric material.

* * * * *